(12) United States Patent
Lu et al.

(10) Patent No.: US 9,055,471 B2
(45) Date of Patent: Jun. 9, 2015

(54) DATA TRANSMISSION METHOD, APPARATUS AND SYSTEM

(75) Inventors: Lei Lu, Shanghai (CN); Wenliang Liang, Shanghai (CN); Jinfang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 13/465,438

(22) Filed: May 7, 2012

(65) Prior Publication Data

US 2012/0218942 A1    Aug. 30, 2012

Related U.S. Application Data

(63) Continuation of application No. PCT/CN2010/078060, filed on Oct. 25, 2010.

(30) Foreign Application Priority Data

Nov. 9, 2009  (CN) .......................... 2009 1 0180157

(51) Int. Cl.
*H04W 4/00* (2009.01)
*H04W 28/06* (2009.01)
*H04L 12/70* (2013.01)

(52) U.S. Cl.
CPC ....... *H04W 28/06* (2013.01); *H04L 2012/5652* (2013.01)

(58) Field of Classification Search
None
See application file for complete search history.

(56) References Cited

U.S. PATENT DOCUMENTS

| 6,788,675 | B1 | 9/2004 | Yang |
| 6,879,581 | B1 | 4/2005 | Leung |
| 2002/0141393 | A1 | 10/2002 | Eriksson et al. |
| 2002/0150094 | A1 | 10/2002 | Cheng et al. |
| 2003/0002438 | A1* | 1/2003 | Yazaki et al. ................. 370/229 |

(Continued)

FOREIGN PATENT DOCUMENTS

| CN | 101094162 | 12/2007 |
| CN | 101094162 A | 12/2007 |

(Continued)

OTHER PUBLICATIONS

International Search Report mailed Feb. 17, 2011 issued in corresponding International Patent Application No. PCT/CN2010/078060.

(Continued)

*Primary Examiner* — Kwang B Yao
*Assistant Examiner* — Hardikkumar Patel
(74) *Attorney, Agent, or Firm* — Staas & Halsey LLP

(57) ABSTRACT

The present invention provides a data transmission method, apparatus and system, which relate to the field of the wireless network technology. The data transmission method provided in the embodiment of the present invention includes: acquiring a downlink data packet sent to a terminal, in which the downlink data packet does not have a high layer protocol stack header; sending the downlink data packet to the terminal through an air interface; Through the present invention, the data amount in the air interface transmission is reduced to a great extent, the efficiency of air interface transmission is substantially enhanced, and the air interface resource is saved, thereby facilitating the enrichment and development of wireless services and satisfying the demands of users. The present invention is applicable to a scenario of air interface transmission in a wireless network.

19 Claims, 11 Drawing Sheets

(56) References Cited

U.S. PATENT DOCUMENTS

| | | | |
|---|---|---|---|
| 2004/0116131 A1* | 6/2004 | Hochrainer et al. | 455/456.1 |
| 2005/0169270 A1* | 8/2005 | Mutou et al. | 370/390 |
| 2005/0185609 A1 | 8/2005 | Malkamaki | |
| 2006/0120352 A1 | 6/2006 | Agashe et al. | |
| 2006/0268818 A1 | 11/2006 | Chen et al. | |
| 2007/0127499 A1* | 6/2007 | Choi et al. | 370/395.52 |
| 2007/0291788 A1* | 12/2007 | Sammour et al. | 370/466 |
| 2008/0025312 A1* | 1/2008 | Kuppuswamy et al. | 370/392 |
| 2009/0016347 A1* | 1/2009 | Lehmann et al. | 370/390 |
| 2009/0080422 A1 | 3/2009 | Lee et al. | |
| 2009/0124207 A1* | 5/2009 | Mody et al. | 455/67.11 |
| 2009/0141715 A1* | 6/2009 | Yi et al. | 370/389 |

FOREIGN PATENT DOCUMENTS

| | | |
|---|---|---|
| CN | 101184278 | 5/2008 |
| CN | 101453286 | 6/2009 |
| EP | 1641193 | 3/2006 |
| JP | 2003-500933 | 1/2003 |
| JP | 2004-507934 | 3/2004 |
| JP | 2004-528764 | 9/2004 |
| JP | 2006-522518 | 9/2006 |
| JP | 2007-522780 | 8/2007 |
| JP | 2008-104105 | 5/2008 |
| JP | 2008-141466 | 6/2008 |
| JP | 2009-246531 | 10/2009 |
| WO | 01/50705 A2 | 7/2001 |

OTHER PUBLICATIONS

Written Opinion of the International Searching Authority mailed Feb. 17, 2011 issued in corresponding International Patent Application No. PCT/CN2010/078060.

WiMax Forum Network Architecture, "Stage 3: Detailed Protocols and Procedures". Release 1.1.1, Sep. 2007, pp. 1-538.

International Search Report of corresponding PCT Application PCT/CN2010/078060 mailed Feb. 17, 2011.

Chinese Office Action mailed Jan. 15, 2013 for corresponding Chinese Application No. 200910180157.6.

Rejection Decision, dated Jun. 4, 2013, in corresponding Chinese App. No. 200910180157.6 (17 pages).

S. Casner et al., "Compressing IP/UDP/RTP Headers for Low-Speed Serial Links", RFC 2508, XP-002121319, Feb. 1999, pp. 1-24.

Extended European Search Report issued Oct. 19, 2012 in corresponding European Patent Application No. 10827873.0.

Japanese Office Action mailed Jan. 14, 2014 in corresponding Japanese Patent Application No. 2012-538177 (4 pages) (3 pages English Translation).

* cited by examiner

DATA TRANSMISSION METHOD, APPARATUS AND SYSTEM

CROSS-REFERENCE TO RELATED APPLICATIONS

This application is a continuation of International Application No. PCT/CN2010/078060, filed on Oct. 25, 2010, which claims priority to Chinese Patent Application No. 200910180157.6, filed on Nov. 9, 2009, both of which are hereby incorporated by reference in their entireties.

FIELD OF THE INVENTION

The present invention relates to the field of wireless network technology, and in particular, to a data transmission method, apparatus and system.

BACKGROUND OF THE INVENTION

With the ongoing increase of demands for wireless services, various services, such as data services, audio/video services, and mobile blogging, have emerged, which raise higher demand for the efficiency of data transmission, that is, the effectiveness of data transmission. Meanwhile, the convergence trend between the mobile communication network and the Internet has also gained much attention.

In the future wireless Internet applications, it is increasingly possible that a terminal acts as a service source and the demand for uplink transmission resource also further increases. However, as the wireless spectrum resources are scarce, if the operators choose to use more spectrum resources, the operating cost increases. If a higher order modulation mode is adopted to increase the transmission amount of the communication data, a higher signal-to-noise ratio is required, resulting in that a base station and a terminal require higher transmission power, which increases the energy consumption and adversely affects the green communication. At present, how to increase the effectiveness of air interface transmission already becomes one of the key factors that constrain the development scale of the wireless service.

When data services are borne wirelessly, a protocol stack header in a in a data packet occupies a substantial part of resources, while this part of resources actually are not effective data required for applications of users. FIG. 1 is a schematic structural diagram of a protocol stack of an RTP video service borne in a wireless network. For example, for one IPv6 voice communication group, a group payload that a user actually needs usually only occupies 22% of the whole group and the rest large part is the data protocol header information. The header information of a protocol data packet that is transmitted over a wireless air interface has to be reduced, to enhance the effectiveness of air interface transmission.

Multiple header compression mechanisms are provided in the prior art to reduce the header information of a protocol data packet that is transmitted over a wireless air interface. For example, the Robust Header Compression (Robust Header Compression, ROHC) mechanism provides a header compression mechanism applicable to a link having a high bit error rate and a long time delay. The ROHC mechanism is a flow-based header compression solution. In the ROHC mechanism, a reference group is taken from a certain flow, and for other groups, only the information that changes relative to the reference group in the header field is sent, to achieve the objective of compression, thereby saving the group header overhead and utilizing the bandwidth more effectively. Meanwhile, the ROHC mechanism also ensures that the ROHC mechanism has high effectiveness and reasonable robustness through the control of frequency and quantity of feedback messages, detection of asynchronous logic and error checking.

During the implementation of the present invention, the inventors find that the prior art at least has the following problems.

The existing header compression mechanism is targeted for the IP/UDP(/TCP)/RTP and mainly compresses protocol header information at different layers based on the concept of layer division. Such a compression mechanism does not consider the data redundancy among layers, especially, the data redundancy between other layers and the application layer, so the compression effect is very limited. Also, the compression mechanism is designed for wired networks and fails to consider the characteristics of wireless networks. When this compression mechanism is used in a wireless network to enhance the efficiency of the air interface transmission, the expected effect cannot be achieved and demands of users cannot be satisfied.

SUMMARY OF THE INVENTION

To solve the problems in the prior art, embodiments of the present invention provide a data transmission method, apparatus and system, which can greatly reduce the data amount transmitted over an air interface, substantially enhance the efficiency of the air interface transmission, and save the air interface resource.

To achieve the foregoing objectives, the embodiments of the present invention adopt the following technical solutions.

An embodiment of the present invention provides a data transmission method, which includes:

acquiring a downlink data packet sent to a terminal, in which the downlink data packet does not have a high layer protocol stack header; and sending the downlink data packet to the terminal through an air interface.

An embodiment of the present invention provides another data transmission method, which includes:

generating an uplink data packet to be sent to an access network, in which the uplink data packet does not have a high layer protocol stack header; and sending the uplink data packet to the access network through an air interface.

An embodiment of the present invention provides another data transmission method, which includes:

receiving an uplink data packet from a terminal, in which the uplink data packet does not have a high layer protocol stack header;

encapsulating a corresponding high layer protocol stack header for the uplink data packet; and forwarding the uplink data packet encapsulated with the high layer protocol stack header.

An embodiment of the present invention provides a network apparatus, which includes:

a downlink data packet acquisition unit, configured to acquire a downlink data packet sent to a terminal, in which the downlink data packet does not have a high layer protocol stack header; and a sending unit, configured to send the downlink data packet acquired by the downlink data packet acquisition unit to the terminal through an air interface.

An embodiment of the present invention provides a terminal, which includes:

an uplink data packet generation module, configured to generate an uplink data packet to be sent to an access network, in which the uplink data packet does not have a high layer protocol stack header; and a data sending unit, configured to send the uplink data packet generated by the uplink data packet generation module to the access network through an air interface.

An embodiment of the present invention provides another network apparatus, which includes:

a data receiving unit, configured to receive an uplink data packet from a terminal, in which the uplink data packet does not have a high layer protocol stack header;

a protocol information recovery unit, configured to encapsulate a corresponding high layer protocol stack header for the uplink data packet received by the data receiving unit; and a forwarding unit, configured to forward the uplink data packet that is encapsulated with the high layer protocol stack header by the protocol information recovery unit.

An embodiment of the present invention further provides a communication system, in which the system includes a network apparatus located at an access network.

The network apparatus is configured to acquire a downlink data packet sent to a terminal, in which the downlink data packet does not have a high layer protocol stack header; send the downlink data packet to the terminal through an air interface; or, receive an uplink data packet from a terminal, in which the uplink data packet does not have a high layer protocol stack header; encapsulate a corresponding high layer protocol stack header for the uplink data packet; and forward the uplink data packet encapsulated with the high layer protocol stack header.

In the technical solutions provided in the embodiments of the present invention, a point-to-point characteristic of transmission in a wireless network is utilized to perform flattening processing on existing protocol stacks, so a data packet that is transmitted between an access network and a terminal through an air interface does not need to carry an unnecessary high layer protocol stack header; and when the access network transfers data to a core network, the access network can recover the high layer protocol stack header of the uplink data packet. Through the technical solutions in the embodiments of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

The technical solutions of the present invention are clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

The development trend that a wireless network becomes flattening is increasingly obvious. For example, in the long term evolution network (LTE/LTE+), relevant functional entities migrate down to an evolved base station (e-NodeB), and the enhancement of connections among the functional entities blurs the boundaries of e-NodeB functional entities/layers, so that a wireless network has an ultra flat protocol stack, that is, according to wireless network characteristics, it is possible to remove all unnecessary protocol layer structures.

The technical concept of the embodiments of the present invention is mainly to utilize the point-to-point characteristic of transmission in a wireless network and context information maintained for a terminal at a network side to perform flattening processing on existing protocol stacks. Due to the single hop characteristic between a terminal and an access node, no additional routing mechanism is required. Therefore, during air interface transmission, an unnecessary protocol header information unit can be removed, so that the size of a data packet during air interface transmission is largely reduced. Also, as an entity at a wireless network side maintains the context information of the terminal, for example, the QoS information/classifier information has a lot of protocol stack related information, such as an IP quintuple, the corresponding protocol stack information is recovered at the wireless network side. The technical solutions in the embodiments of the present invention may greatly enhance the efficiency of air interface transmission, and an air interface resource is saved, thereby facilitating the enrichment and development of wireless services.

Figure 1:
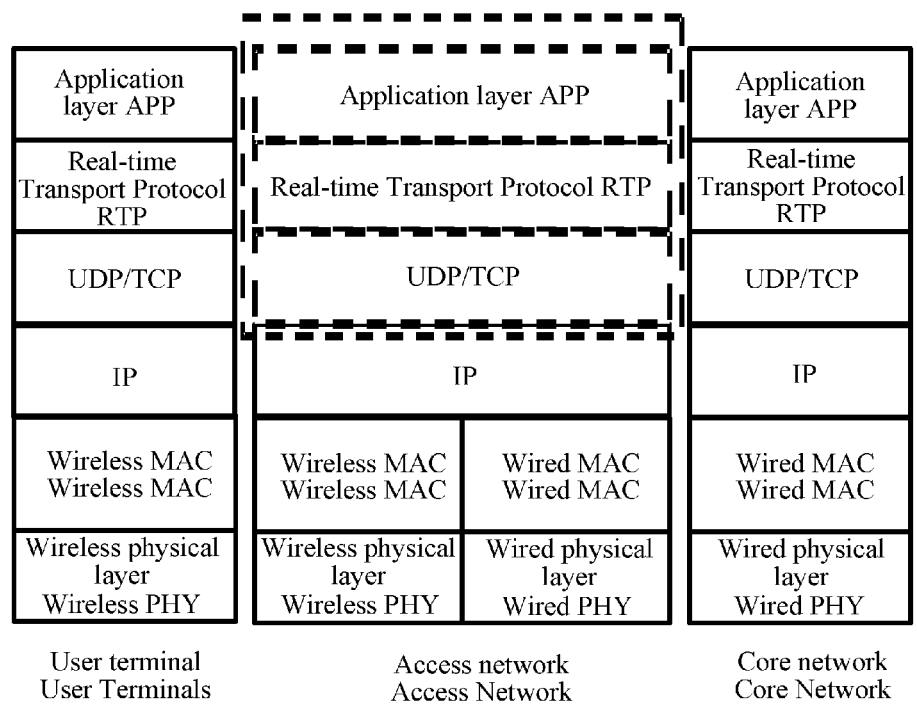
FIG. 1 is a schematic structural diagram of a protocol stack of an RTP video service borne in a wireless network in the prior art.
Figure 2:
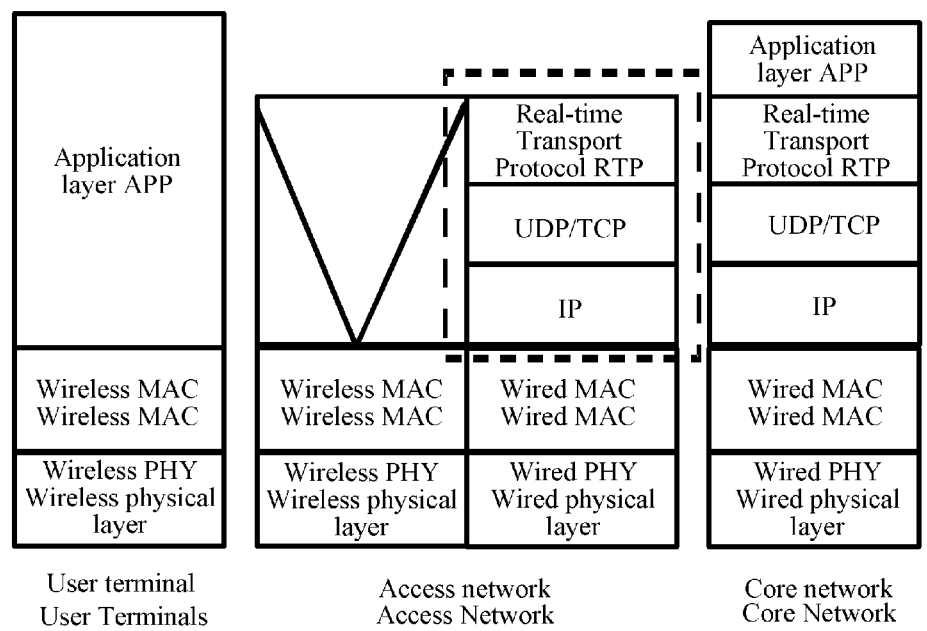
FIG. 2 is a schematic diagram of architecture of an ultra flat protocol stack provided in n embodiment of the present invention.

An embodiments of the present invention realizes an ultra flat protocol stack at a wireless network side and a corresponding terminal side, and the schematic diagram of architecture is shown in FIG. 2, that is, during air interface transmission, application layer (Application) data is directly borne on a physical layer (PHY) and a media access control layer (MAC) to save the air interface resource.

In a communication system provided in an embodiment of the present invention, for downlink transmission, after receiving a downlink data packet from a core network (Core Network), an access network (Access Network) updates, according to a requirement, context information maintained by the access network, removes protocol headers, such as Internet Protocol/User Datagram Protocol (Transmission Control Protocol)/Real-time Transport Protocol IP/UDP(TCP)/RTP of the data packet, maps the application of the downlink data packet to a corresponding air interface connection or air interface channel, and maintains the corresponding context information. Subsequently, the access network directly bears the downlink data packet on an access network internal tunnel and an access network air interface connection or air interface channel to transmit the downlink data packet to a user equipment (UE), or after adding necessary information in the downlink data packet, the access network bears the downlink data packet on an access network internal tunnel and an access network air interface connection or air interface channel to transmit the downlink data packet to a UE. After receiving the downlink data packet, the UE removes PHY and MAC headers and transfers the data packet to a corresponding application.

For uplink transmission, the UE maps the generated application of an uplink data packet to a corresponding air interface connection, and the uplink data packet is a data packet that supports an ultra flat protocol stack. Subsequently, the UE directly bears the uplink data packet on an access network air interface and an access network internal channel (when the channel exists) and transmits the uplink data packet to the access network, or after adding necessary information, the UE bears the uplink data packet on an access network air interface and an access network internal channel (when the channel exists) and transmits the uplink data packet to the access network. After obtaining the uplink data packet, the access network, according to context information of an application corresponding to the UE, recovers or regenerates header information of a corresponding protocol stack data packet, encapsulates the corresponding information into an IP/UDP(TCP)/RTP data packet, bears the data packet on a wired link, and sends the data packet to a core network.

In the air interface transmission, as a point-to-point air interface connection exists between a UE and a base station (BS), and a point-to-point tunnel exists between a BS and a gateway (GateWay, GW), the IP may not be required to provide routing information; relevant UDP/TCP information exists in classifier information maintained by the access network, so the UDP/TCP may not be required to provide port information of a relevant data packet, or the like; for the RTP, when the terminal acts as a service source, wireless scheduling has sequentiality, so relevant information, such as a sequence number (SN) and timestamp (timestamp), is predictable. In this way, in the embodiment of the present invention, the IP/UDP(TCP)/RTP protocol header can be removed in air interface transmission, so as to realize an ultra flat protocol stack structure.

Figure 3:
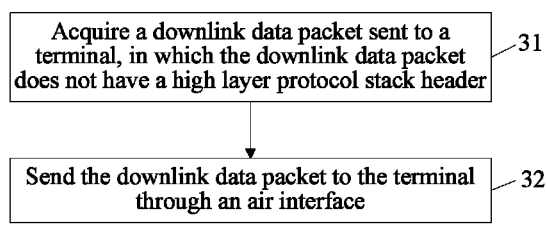
FIG. 3 is a schematic flow chart of a data transmission method provided in Embodiment 1 of the present invention.

A data transmission method is provided in Embodiment 1 of the present invention, and as shown in FIG. 3, the method includes the following steps.

Step 31: Acquire a downlink data packet sent to a terminal, in which the downlink data packet does not have a high layer protocol stack header.

Step 32: Send the downlink data packet to the terminal through an air interface.

In the embodiment of the present invention, step 31 and step 32 may be implemented by relevant network elements and functional entities, such as an e-NodeB, a GateWay and an application proxy/application function, in an access network. In the embodiment of the present invention, it is required that both an access network and a terminal support an ultra flat protocol stack in data transmission in a downlink direction.

In step 31, the access network can receive a downlink data packet that has a high layer protocol stack header and is sent by a core network, remove the high layer protocol stack header of the downlink data packet, and send the downlink data packet to the terminal; and/or, for two terminals that access the same access network, when local transmission is supported, one terminal sends a data packet having no high layer protocol stack header to the access network, and after receiving the data packet, the access network sends the data packet as the downlink data packet to the other terminal.

The high layer protocol stack header includes at least one or a combination of the following: an IP header, a UDP header, a TCP header and an RTP header. When removing the high layer protocol stack header, the access network can, according to a requirement, remove all of the IP, UDP, and RTP headers, or remove all of the IP, TCP, and RTP headers, and may also only remove the IP header, or only remove the IP header and UDP header or only remove the IP header and TCP header and the like.

In the embodiment of the present invention, when removing the high layer protocol stack header, the access network can further maintain, according to a data packet type and a relevant policy, context information related to the high layer protocol stack header. The maintained context information is mainly used to recover the high layer protocol stack header of the uplink data packet that supports the ultra flat protocol. For different headers, the corresponding context information is also different.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

Figure 4:
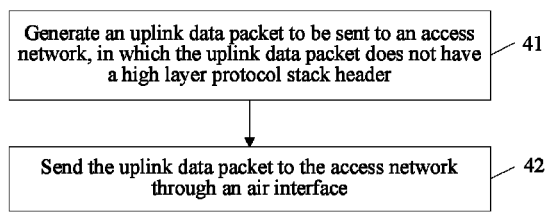
FIG. 4 is a schematic flow chart of a data transmission method provided in Embodiment 2 of the present invention.

A data transmission method is provided in Embodiment 2 of the present invention, and as shown in FIG. 4, the method includes the following steps.

Step 41: Generate an uplink data packet to be sent to an access network, in which the uplink data packet does not have a high layer protocol stack header.

Step 42: Send the uplink data packet to the access network through an air interface.

In Embodiment 2 of the present invention, step 41 and step 42 can be implemented by a terminal, such as a UE. In the embodiment of the present invention, it is required that both an access network and a terminal support an ultra flat protocol stack in data transmission in an uplink direction.

The high layer protocol stack header includes at least one or a combination of the following: an IP header, a UDP header, a TCP header and an RTP header. When generating the data packet, the terminal may not generate all of the IP, UDP, and RTP headers, or all of the IP, TCP, and RTP headers, and may also only generate the IP header, or only generate the IP header and the UDP header or only generate the IP header and the TCP header according to a requirement.

Specifically, the terminal can generate the uplink data packet to be sent to the access network, according to at least one or a combination of the following manners:

directly encapsulating an application data packet as a media access control MAC data packet, to generate the uplink data packet; or first encapsulating an application data packet as an RTP data packet, and then encapsulating it as a MAC data packet, to generate the uplink data packet; or first encapsulating an application data packet as an UDP/TCP data packet, and then encapsulating it as a MAC data packet, to generate the uplink data packet, where "/" denotes "or", that is, the application data packet is first encapsulated as a UDP data packet, and then encapsulated as a MAC data packet, or the application data packet is first encapsulated as a TCP data packet, and then encapsulated as a MAC data packet; or, first encapsulating an application data packet as an IP data packet, and then encapsulating it as a MAC data packet, to generate the uplink data packet; or, first encapsulating an application data packet as an RTP data packet and a UDP/TCP data packet in sequence, and then encapsulating it as a MAC data packet, to generate the uplink data packet; or, first encapsulating an application data packet as an RTP data packet and an IP data packet in sequence, and then encapsulating it as a MAC data packet, to generate the uplink data packet; or, first encapsulating an application data packet as a UDP/TCP data packet and an IP data packet in sequence, and then encapsulating it as a MAC data packet, to generate the uplink data packet.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

Figure 5:
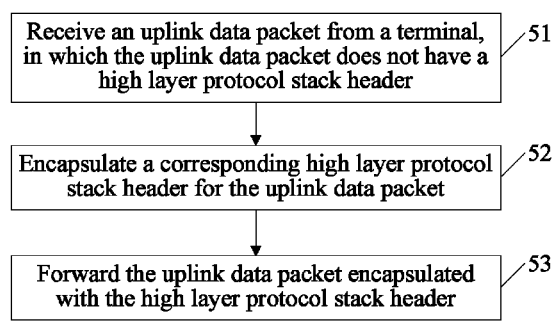
FIG. 5 is a schematic flow chart of a data transmission method provided in Embodiment 3 of the present invention.

A data transmission method is provided in Embodiment 3 of the present invention, and as shown in FIG. 5, the method includes the following steps.

Step 51: Receive an uplink data packet from a terminal, in which the uplink data packet does not have a high layer protocol stack header.

Step 52: Encapsulate a corresponding high layer protocol stack header for the uplink data packet.

Step 53: Forward the uplink data packet encapsulated with the high layer protocol stack header.

In the embodiment of the present invention, step 51 to step 53 may be implemented by relevant network elements and functional entities, such as an e-NodeB, a GateWay and an application proxy/application function, in an access network. In the embodiment of the present invention, it is required that both an access network and a terminal support an ultra flat protocol stack in data transmission in a downlink direction.

The access network utilizes the maintained context information of each high layer protocol stack header, for example, the context information of the high layer protocol stack header already recorded during the transmission of a downlink data packet, as well as the context information of a relevant application maintained in the network, to recover the high layer protocol stack header; or, for a specific application, when the access network fails to independently recovers the information of the corresponding high layer protocol stack header, and when the terminal sends a first data packet of a relevant protocol stack, for example, a TCP data packet, the terminal sends a data packet carrying a complete high layer protocol stack header, so that the access network learns information of the high layer protocol stack header, and uses the information in the recovery of a header of a subsequent relevant uplink data packet.

In the technical solutions provided in the embodiment of the present invention, a point-to-point characteristic of transmission in a wireless network is utilized, to perform flattening processing on existing protocol stacks, and during air interface transmission between the access network and the terminal, the unnecessary high layer protocol stack header of the data packet is removed; when transferring data to a core network, the access network recovers the high layer protocol stack header of the uplink data packet. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

It can be understood that according to a requirement, the structure of the ultra flat protocol stack provided in the embodiment of the present invention can be implemented in the uplink direction only, or the structure of the ultra flat protocol stack provided in the embodiment of the present invention can be implemented in the downlink direction only; or, the structure of the ultra flat protocol stack provided in the embodiment of the present invention can be implemented in the uplink and downlink directions at the same time.

A data transmission method provided in Embodiment 4 of the present invention is illustrated in detail in the following.

To guarantee normal transmission of data in an ultra flat protocol stack architecture, first, a wireless access network needs to learn a UE's capability of supporting the ultra flat protocol stack and the UE needs to learn the wireless access networks capability of supporting the ultra flat protocol stack, and an ultra flat protocol stack capability is the capability that the access network or terminal supports an inessential high layer protocol stack header and/or the manner of implementing the lack of certain information of a high layer protocol stack header.

In the embodiment of the present invention, during a network access process, the UE needs to negotiate, with a wireless side, the ultra flat protocol stack supported by the UE or a profile (Profile) corresponding to the ultra flat protocol stack, so as to inform the wireless access network of the ultra flat protocol stack capability supported by the UE. Different Profiles correspond to definitions of different ultra flat protocol stacks. The Profile indicates the high layer protocol stack header which the data packet does not necessarily have and other information required for the application of the Profile. Referring to Table 1, an example of a type of Profile set is given.

TABLE 1

| Profile Index (Profile Index) | Profile Content (Profile Content) |
| --- | --- |
| 1 | Remove an IP/UDP/RTP layer |
| 2 | Remove an IP/TCP/RTP layer |
| 3 | Remove an IP/UDP/RTP, and add an application assistant layer |
| 4 | Remove an IP layer |
| 5 | Remove an IP/UDP (/TCP) layer |
| ... | |

The access network informs, through a system broadcast message, the UE of the capability of supporting the ultra flat protocol stack. For example, an e-NodeB broadcasts the ultra flat protocol stack capability supported by the e-NodeB to the UE in a periodic system broadcast message, and optionally, the e-NodeB can broadcast the ultra flat protocol stack capability supported by the e-NodeB to the UE by carrying the supported Profile of the ultra flat protocol stack in a system message. The UE can learn the support of the wireless access network through the system broadcast message.

Figure 6:
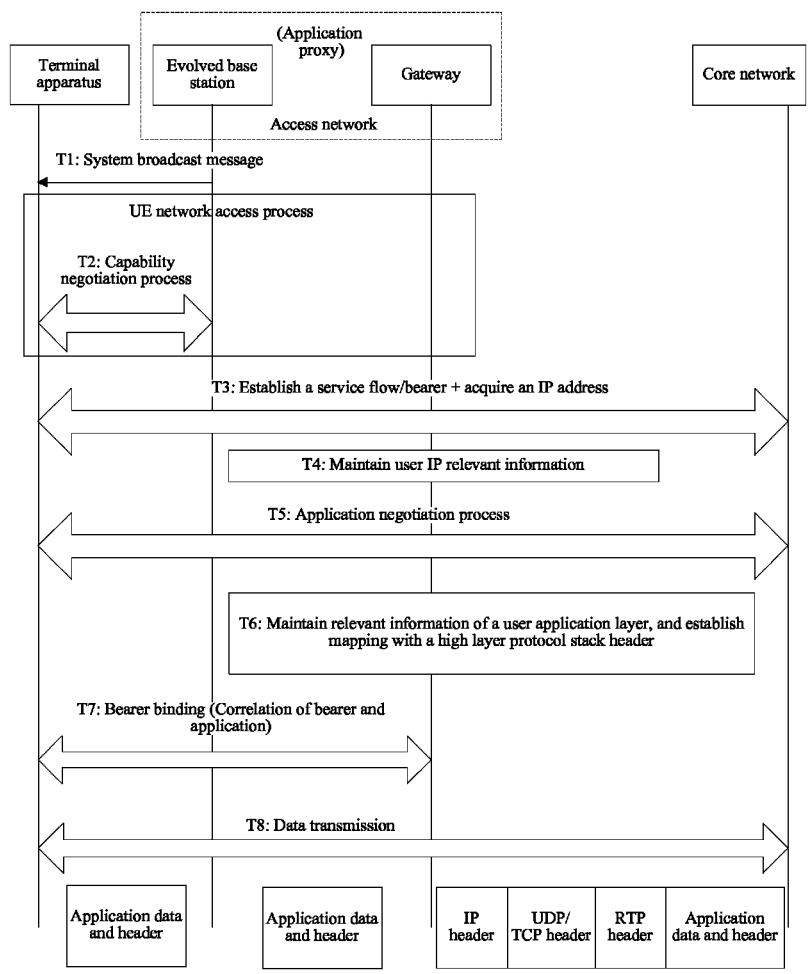
FIG. 6 is a flow chart of a network access negotiation process of a UE provided in an embodiment of the present invention.

Referring to FIG. 6, a network access negotiation process between a UE and a wireless access network is illustrated in detail, in which the IP/UDP/RTP high layer protocol stack structure is taken as an example for description. However, the present invention is not limited to such a protocol stack structure.

Step T1: An e-NodeB sends a system broadcast message to a UE to inform the UE of an ultra flat protocol stack capability supported by an access network.

Step T2: In a network access process, during a capability negotiation process, the UE informs the access network of the UE's ultra flat protocol stack capability through a capability negotiation message. According to the capability of the UE, subscription information of a user and the capability thereof, the access network decides a Profile set that the UE is allowed to use, in which the Profile set may include one or more Profiles.

Through steps T1 and T2, the UE and the access network can learn the ultra flat protocol stack capability of each other, and on this basis, data transmission is implemented between the UE and the access network.

Step T3: After finishing a basic network access process, the UE establishes a corresponding service flow or bearer binding (Bearer Binding), and acquires a corresponding IP address.

Step T4: The access network, such as a gateway, establishes relevant context information of the UE, and especially IP protocol relevant information, for example, information such as an IP address and a version number of the UE.

Step T5: When the UE needs to use a specific application, the UE finishes an application negotiation establishment process with the core network (or another UE) through application layer signaling.

Step T6: in the application establishment process, if the access network does not have protocol stack context information related to this application yet or original protocol stack context information is changed, the access network adds or updates relevant protocol stack information, such as UDP/TCP information, RTP information and application information to a UE context, such as a UDP port number, a TCP port number and sequence number, and an RTP timestamp and sequence number.

Step T7: The access network establishes a relevant bearer of the application for the UE and binds the application to a certain bearer that is newly created or already exists.

Step T8: Execute data transmission, which mainly includes the following processing.

When receiving data from the core network, the access network removes the corresponding high layer protocol stack header, for example, an IP/UDP(TCP)/RTP header, directly bears application layer data inside the access network and on an air interface, and sends the data to the UE through the air interface; when sending data to the access network, the UE directly sends the application layer data on the air interface, the application layer data is directly transmitted inside the access network, and according to the context information and application data packet information of the UE (either application data header information or application data information), the access network recovers the corresponding IP/UDP (TCP)/RTP header and transmits the header to a corresponding core network.

In a data transmission method provided in Embodiment 5 of the present invention, an ultra flat protocol stack structure is adopted, and a data packet of an application is directly borne on an air interface connection (for example, a MAC connection), and one MAC connection can bear one or more applications. To guarantee normal transmission of data, a classification and convergence method for application data is provided in Embodiment 3 of the present invention, to bear an application on a corresponding MAC connection.

An application-air interface convergence sublayer, for example, an application-media access control convergence sublayer (APP-MAC Convergence Sublayer, APP-MAC CS), may be set in a protocol stack structure supported by a terminal and an access network. The access network utilizes the newly set application-air interface convergence sublayer to perform classification and convergence on relevant application data, or this function may also be implemented by other apparatuses in the access network.

The APP-MAC CS defines a series of classifiers (Classifiers). A classifier parses an application data packet in a downlink data packet, learns corresponding application information (for an uplink data packet, the terminal can directly learn corresponding application information), utilizes a preset rule to confirm the application classification, and when establishing a bearer, maps the application on an air interface connection according to the application classification. In the embodiment of the present invention, a media access control (MAC) connection is taken as an example for the air interface connection for description. However, the present invention is not limited thereto, and according to a specific network structure and an application scenario, the air interface connection may also be another suitable wireless connection. The same description is also applicable to the relevant content in the following.

The preset rule may be to map each application on a different MAC connection according to a different type of the application, or to map each application on a different MAC connection according to a size and running time of the application; or to map each application on a different MAC connection by combining several factors. For example, the preset rule may be an IP quintuple, or an in-depth packet detection technology may also be directly utilized to realize the function of classification and convergence.

Figure 7:
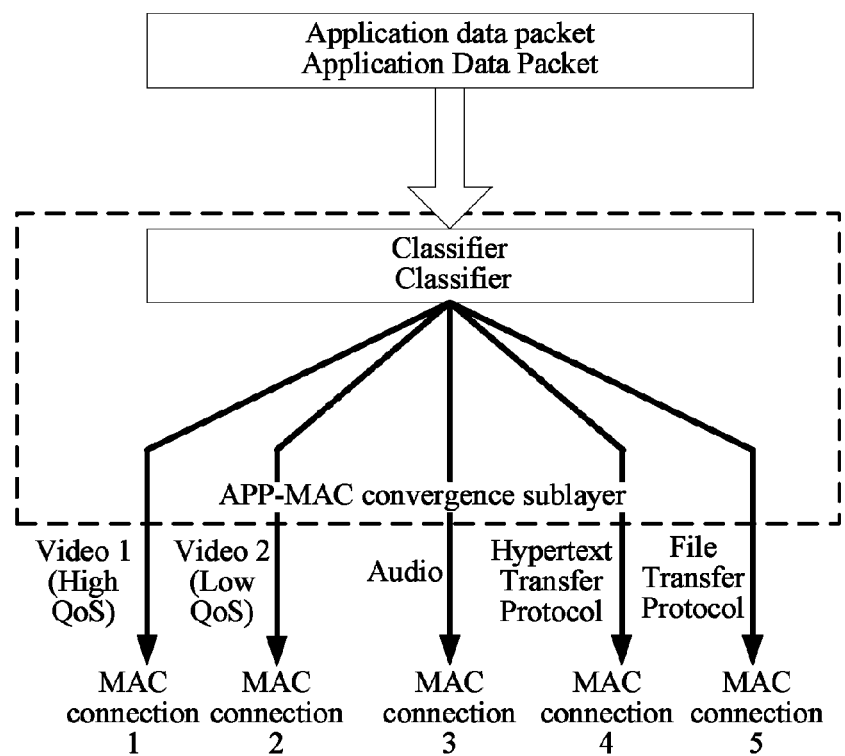
FIG. 7 is a schematic diagram of a classifier provided in an embodiment of the present invention.

For example, referring to FIG. 7, according to an application type, such as a video (Video), an audio (Audio), streaming media, a hypertext transfer (HTTP) service, a file transfer (FTP) service, as well as an application characteristic, such as a quality of service (QoS) requirement required by the application and an application identification, the classifier classifies applications, and bears the applications on corresponding MAC connections. According to the quantity of applications borne on a MAC connection, two cases are taken for describing the method of mapping an application on a MAC connection.

In a first case, one MAC connection is mapped to one application.

In this case, only one application is borne on a MAC connection, and according to the application classification, an air interface connection identifier corresponding to the MAC connection is directly correlated to the application, or the air interface connection identifier and an access network internal channel identifier (when an internal channel exists) are both correlated to the application.

In a downlink direction, according to the application classification, the access network correlates an air interface connection identifier and/or an access network internal channel identifier to the application, to transmit an application data packet on a corresponding access network internal channel and/or MAC connection; in an uplink direction, according to the application classification, the UE correlates the air interface connection identifier and/or the access network internal channel identifier to the application, to transmit the application data packet in the corresponding MAC connection and/or access network internal channel.

In a second case, one MAC connection is mapped to multiple applications.

In this case, multiple applications are borne on a MAC connection, to identify the multiple applications on the MAC connection can at least be implemented in the following four manners.

First Manner

The UE or access network sets a connection indication identification and an application identification in an air interface connection identifier, for example, groups several bits in the air interface connection identifier as the connection indication identification and groups the rest bits as the application identification, in which the connection indication identification is used for indicating that a specific air interface is used for bearing a MAC connection; and the application identification is used to map the specific application borne on the MAC connection.

Second Manner

Figure 8A:
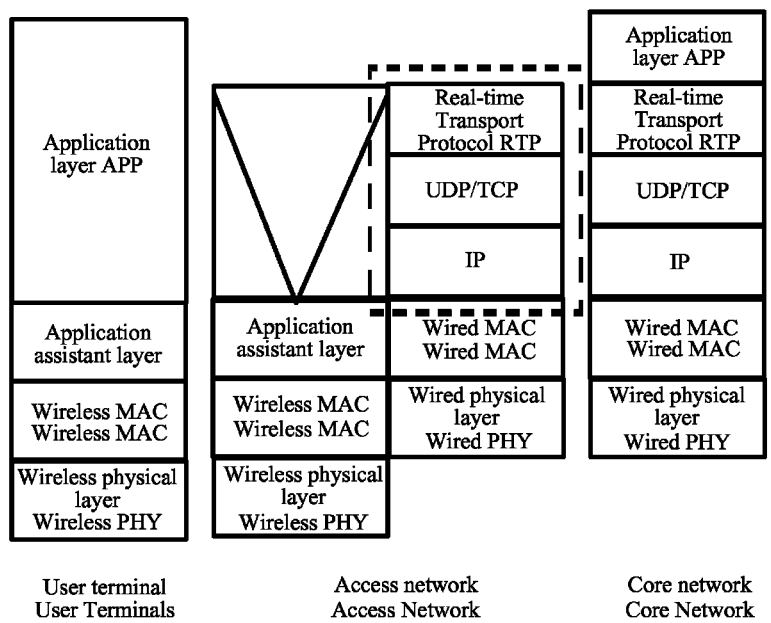
FIG. 8A is a schematic diagram of an application assistant layer provided in an embodiment of the present invention.
Figure 8B:
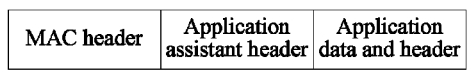
FIG. 8B is a schematic diagram of an application assistant header provided in an embodiment of the present invention.

Referring to FIG. 8A, an application assistant layer (Application Assistant Layer) is added between an application layer and a MAC layer to assist the implementation of an ultra flat protocol stack, that is, an application assistant header (Application Assistant Header) is added between a MAC header and an application data & header (Application Data & Header), as shown in FIG. 8B. The application assistant header is used for indicating corresponding context information and the correspondence between an application and a MAC connection.

Third Manner

Figure 8C:
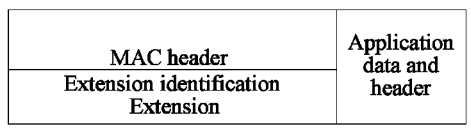
FIG. 8C is a schematic diagram of a MAC header provided in an embodiment of the present invention.

Referring to FIG. 8C, a wireless access control header, for example, a MAC header or an RLC header, is extended to assist the implementation of an ultra flat protocol stack, for example, several bits in the MAC header or the RLC header are utilized to set an extension identification, in which the extension identification is used for indicating corresponding context information and the correspondence between an application and a MAC connection.

Fourth Manner

The access network performs in-depth packet detection on the downlink data packet to confirm a MAC connection corresponding to an application of the downlink data packet.

An application proxy (Application Proxy)/application function (Application Function) is set in an access network, and the application proxy/application function is utilized to perform in-depth packet detection on the application data packet. Through the analysis of the application data packet, the specific data content of the application data packet is detected, and in combination with the application context information of the UE maintained by the access network, a MAC connection of this application is confirmed.

Figure 9A:
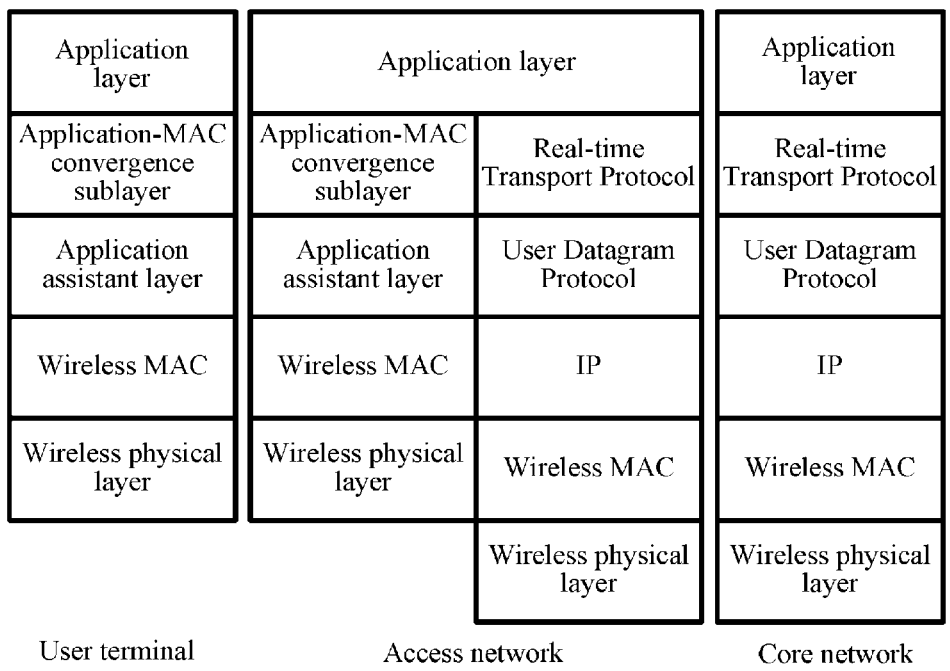
FIG. 9A is a schematic diagram of an APP-MAC CS provided in an embodiment of the present invention.
Figure 9B:
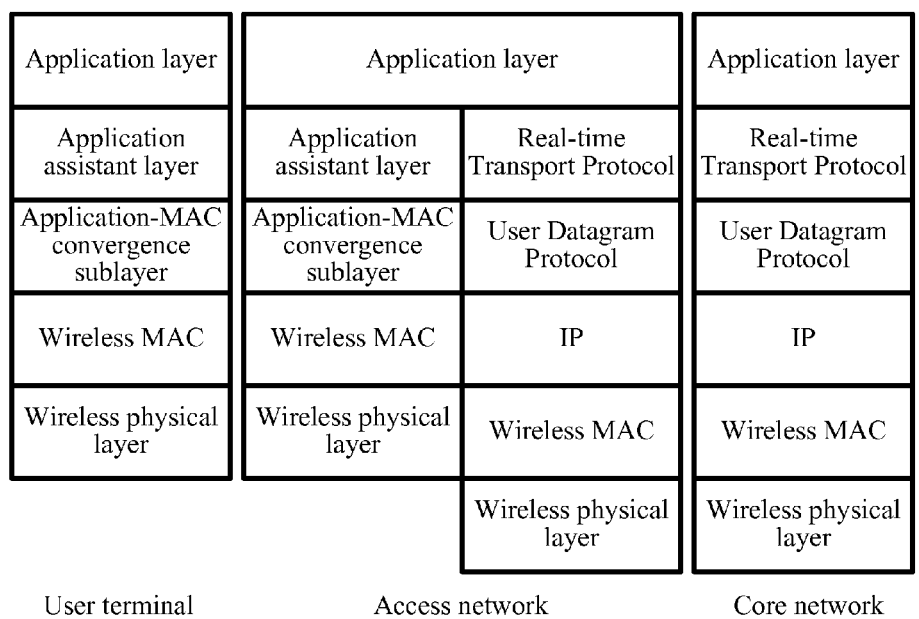
FIG. 9B is a schematic diagram of another APP-MAC CS provided in an embodiment of the present invention.

Referring to FIG. 9A and FIG. 9B, in the embodiment of the present invention, two possible positions of the APP-MAP CS in the protocol stack structure are given. In FIG. 9A and FIG. 9B, the second manner is taken as an example for illustrating the structure of the APP-MAP CS in a protocol stack. It can be understood that, when the second manner is not adopted, the application assistant layer in FIG. 9A and FIG. 9B can be removed.

In FIG. 9A, the APP-MAC CS is located above the application assistant layer, that is, for an application data packet, a protocol stack first classifies application data, maps the application data to a specific MAC connection, and then retrieves context information required for air interface transmission of the RTP/UDP(/TCP)/IP layer related to the application.

In FIG. 9B, the APP-MAC CS is located below the application assistant layer, that is, the context information required for air interface transmission for the RTP/UDP(/TCP)/IP layer related to the application is retrieved first, and then the application data packet is classified and mapped to a specific MAC connection.

In Embodiment 6 of the present invention, the removal and recovery of the IP/UDP(TCP)/RTP header are mainly taken as an example for illustrating a data transmission method provided in the embodiment of the present invention.

In a downlink direction, for some protocol stack headers, an access network removes a corresponding header in a data packet and maintains context information corresponding to the header, for example, utilizes an application proxy/application function to maintain context information including information in an IP header, information in a UDP header, information in a TCP header, and information in an RTP header; in an uplink direction, according to the maintained context information, the access network recovers a header of the data packet, or the access network directly generates and recovers a corresponding header. For some specific applications, according to a header of a first data packet (a header carrying complete protocol stack information) sent by a UE in a network access process or sent by a UE in an uplink direction, the access network can also obtain context information related to the IP/UDP(TCP), for recovering a high layer protocol stack header.

The method for processing each header is illustrated in the following.

Table 2 is a schematic structural diagram of an IP header. The version indicates an IP version for transmitting data, and the size is 4 bits; the header length is used for specifying a header length; the type of service is used for setting a priority or a priority level of data transmission, and the size is 8 bits; the total length is used for indicating a total length of a datagram, the total length of the datagram=the header length+the data length, and the size is 16 bits; the identification is used for identifying all segments, and the size is 16 bits; a segment mark is used for confirming whether a datagram can be segmented, and at the same time points out whether more segments follow a current segment, and the size is 3 bits; segment offset amount is used for looking for a position of a segment in a whole datagram, and the size is 13 bits; lifetime is used for set the maximum number of routers that a datagram can pass through, and the length is 8 bits; the protocol indicates an upper layer protocol of data for creating a data field, and the size is 8 bits; the checksum is used for checking the completeness of transmitted data, and the size is 16 bits; the source address indicates a source IP address, and the field length is 32 bits; the destination address indicates a destination IP address, and the field length is 32 bits; the option is not an essential field, and the field length specifically depends on a selected IP option.

TABLE 2

| Version (VERS) | Header Length (HLFD) | Type of Service (TOS) | Total Length (PACKET LENGTH) | |
|---|---|---|---|---|
| Identification (IDENTIFICATION) | | | Fragment Mark | Fragment Offset Amount |
| Lifetime | | Protocol | | Checksum |
| Source Address (SOURCE ADDRESS) | | | | |
| Destination Address (DESTINATION ADDRESS) | | | | |
| Option | | | | Padding |

When an IP header is removed in a downlink direction, information in the IP header is recorded and maintained, for example, a source/destination IP address is recorded. An existing fragmented IP packet (with the IPID information removed) requires assembly processing. In an uplink direction, during the recovery of the IP header, according to the maintained context, the source/destination IP address is recovered, and proper fragmentation processing is performed on the IP packet according to a requirement. For example, when receiving multiple IP packets with large capacities at the same time, the access network first performs fragmentation processing on each of the IP packets and then forwards it.

For information other than the source/destination IP address in Table 2, according to the specific information of received uplink data packets, the access network can learn corresponding information, such as the version, header length, type of service, total length, identification, fragment mark, fragment offset amount, lifetime, protocol, checksum, option and padding.

Table 3 shows a schematic structural diagram of a UDP header.

TABLE 3

| Source Port | Destination Port |
|---|---|
| Source Port Number | Destination Port Number |
| Length | Checksum |
| Datagram Length | Checksum |

When a UDP header is removed in a downlink direction, information in the UDP header is recorded and maintained, for example, a source/destination port number is recorded. In an uplink direction, during the recovery of a UDP header, according to the recorded source/destination port number, a source/destination IP address is recovered, and according to the specific information of the received uplink data packet, corresponding information, such as a datagram length and a checksum, in Table 3 is learned.

For a certain application, the source port number and destination port number on the uplink are opposite to the source port number and destination port number on the downlink. Therefore, the application proxy/application function located at the access network can be utilized to record the source port number and destination port number of a downlink data packet as the context of the application. When an uplink application data packet is received, the Length can be calculated according to the size of the application data packet, and then, through the destination port number of the uplink=the source port number of the downlink, the source port number of the uplink=the destination port number of the downlink, the corresponding UDP protocol header information is recovered.

Table 4 shows a schematic structural diagram of a TCP header.

TABLE 4

| Source Port Number | | | | | | | | Destination Port Number |
|---|---|---|---|---|---|---|---|---|
| Sequence Number | | | | | | | | |
| Acknowledgement Number | | | | | | | | |
| Header Length | Reserved Bit | URG | ACK | PSH | RST | SYN | FIN | Window Size |
| Checksum | | | | | | | | Emergency Pointer |
| Option | | | | | | | | Padding |

The URG represents an emergency bit, the ACK represents an acknowledgement bit, the PSH represents an urgent bit, the RST represents a reset bit, the SYN represents a synchronization bit, and the FIN represents a termination bit.

When a TCP header is removed in a downlink direction, information in the TCP header in the downlink direction is recorded, in which the information includes recording and maintenance of a corresponding source/destination port number, maintenance of corresponding uplink and downlink sequence numbers and acknowledgement numbers, and retransmission context information. In the uplink direction, during the recovery of the TCP header, according to the recorded information in the TCP header, the TCP header is recovered.

During the recovery of the TCP header, the network side is required to provide necessary assistance. For example, the network side needs to assist to recover the source/destination port number and sequence number. For information other than the source/destination port number in Table 4, for example, the specific contents, such as the sequence number, acknowledgement number, header length, reserved bit, emergency bit, acknowledgement bit, urgent bit, reset bit, synchronization bit, termination bit, window size, checksum, emergency pointer, option and padding, the access network can learn the information according to the specific information of the received uplink data packet.

Figure 10:
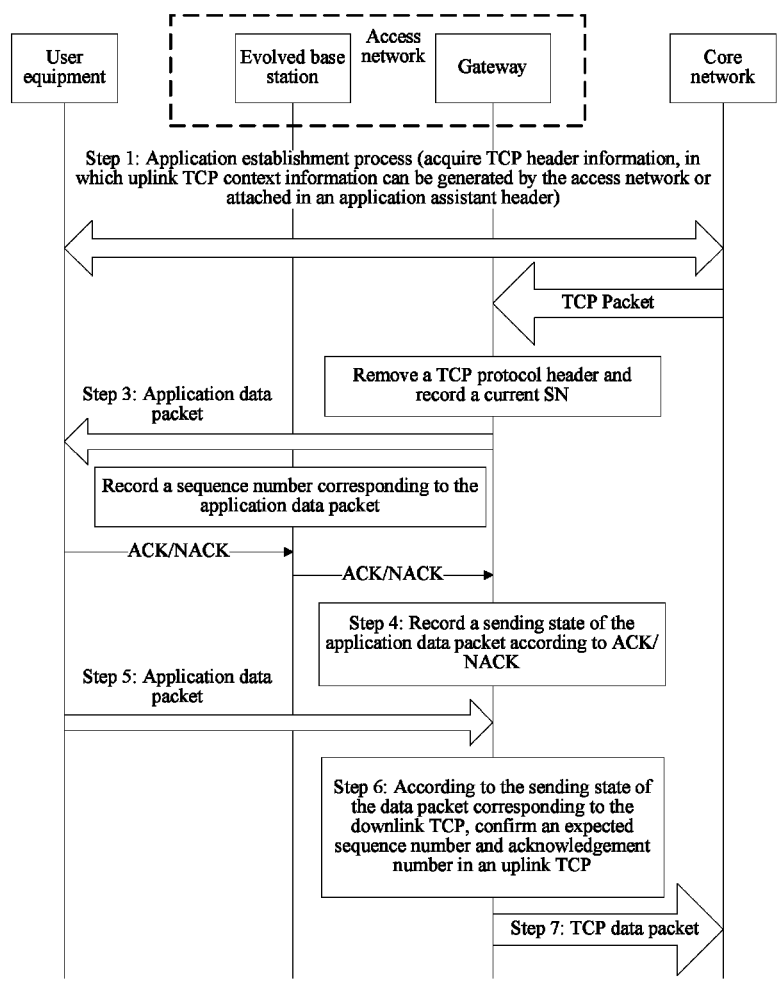
FIG. 10 is a schematic flow chart of a context maintenance and retransmission mechanism of a TCP header provided in an embodiment of the present invention.

FIG. 10 is a schematic flow chart of context maintenance and a retransmission mechanism of a TCP header, which specific includes the following steps.

Step 1: In an uplink direction, in a process of establishing an application, after receiving or generating a corresponding TCP header, an access network maintains context information of the TCP header, for example, the access network utilizes the application proxy/application function to establish context information of a TCP protocol header.

According to the maintained context information, the access network encapsulates a data packet and recovers the TCP header, and the following manners may be included.

Manner 1: An application proxy/application function generates a relevant context of the TCP, to realize TCP encapsulation.

In such a manner, the application proxy/application function generates a source/destination port number, an initial value of a sequence number, a header length, URG, ACK, PSH, RST, SYN, FIN, a window size, and so on in the TCP header.

Manner 2: A UE generates a relevant context of the TCP, to realize TCP encapsulation.

For a first uplink TCP data packet, the UE sends a complete TCP header, and the access network records information in the TCP header, and uses the information for the recovery of a subsequent TCP header.

Alternatively, an application assistant layer is set, the UE sends, to the access network, a TCP data packet whose TCP header is removed, the TCP data packet has an application assistant header, and the source port number, the initial value of the sequence number, header length, URG, ACK, PSH, RST, SYN, FIN, window size and so on are carried in the application assistant header.

Step 2: In a downlink direction, when receiving the TCP data packet from the core network, the access network records and updates the current source port number, sequence number, acknowledgement number, header length, URG, ACK, PSH, RST, SYN, FIN, and window size, and removes the corresponding TCP protocol header.

For an uplink direction, the method for recovering an acknowledgement number and a sequence number in a TCP header is illustrated in detail.

Step 3: The access network directly bears the corresponding application data on an access network internal channel and an air interface and transmits the data on the air interface. If the application proxy/application function does not realize the combination of TCP retransmission and MAC ARQ retransmission, the application proxy/application function records the sequence number (SN) corresponding to a current application, and step 4 is executed; if the application proxy/application function realizes the combination of TCP retransmission and MAC ARQ retransmission, the application proxy/application function, in replacement of the UE, initiates a retransmission process of a TCP data packet of a user.

Step 4: According to ACK/NACK information fed back by a relevant data packet with the ARQ lifetime (lifetime) overdue on an air interface, the access network confirms whether a sending state of a current application data packet is successful or failed. Step 4 can be implemented by an e-NodeB in an access network, and may also be implemented by a GW.

Step 5: The UE directly encapsulates application data on an air interface bearer and sends the data to the access network.

Step 6: According to the corresponding ARQ information (CRC), the access network checks whether a relevant application data packet is correct, and according to a relevant ARQ SN, determines a position of an application layer data packet in the application layer data packet, and in combination with the application context maintained by the access network, confirms a current TCP sequence number.

For the case in which the application proxy/application function realizes combination of TCP retransmission and MAC ARQ retransmission, a TCP sequence number of the downlink data packet that is currently correctly received is used as an acknowledgement number; and otherwise, according to the transmission information of the application data packet recorded in step 4, the acknowledgement number is set as the TCP sequence number of the data packet that is correctly and last successfully transmitted+a TCP data packet load length/TCP data block length+1, in which the TCP sequence number, the TCP data total length and the TCP data block length in the expression is the TCP sequence number, TCP data packet load length and TCP data block length of the downlink data packet that is last correctly transmitted, that is, the acknowledgement number is 1 plus a sum of the TCP sequence number and a quotient between the TCP data packet load length and the TCP data block length. Then, according to the TCP context information of the UE, the header length, URG, ACK, PSH, RST, SYN, FIN, window size and so on are confirmed, to recover the TCP header.

Step 7: The access network sends the TCP data packet whose TCP header is recovered to the core network.

Table 5 shows a schematic structural diagram of an RTP header. P represents a padding (Padding), X represents extension (Extension), and CC represents the number of contributing cells (CSRC count). M represents a marker (Marker). The synchronization source identifier and the contributing source identifier may coexist, or either the synchronization source identifier or the contributing source identifier may exist.

TABLE 5

| Version | P | X | CC | M | Load Type | Sequence Number (SEQUENCE NUMBER) |
|---------|---|---|----|----|-----------|-----------------------------------|
| Timestamp (TIME STAMP) ||||||||
| Synchronization Source Identifier (SYNCHRONIZATION SOURCE IDENTIFIER) ||||||||
| Contributing Source Identifier (CONTRIBUTING SOURCE IDENTIFIER) ||||||||

When an RTP header is removed in a downlink direction, information in the RTP header in the downlink direction is recorded and maintained, in which the information includes a corresponding synchronization source identifier and/or contributing source identifier. In an uplink direction, during the recovery of the RTP header, according to the recorded information in the RTP header, the RTP header is recovered.

Figure 11:
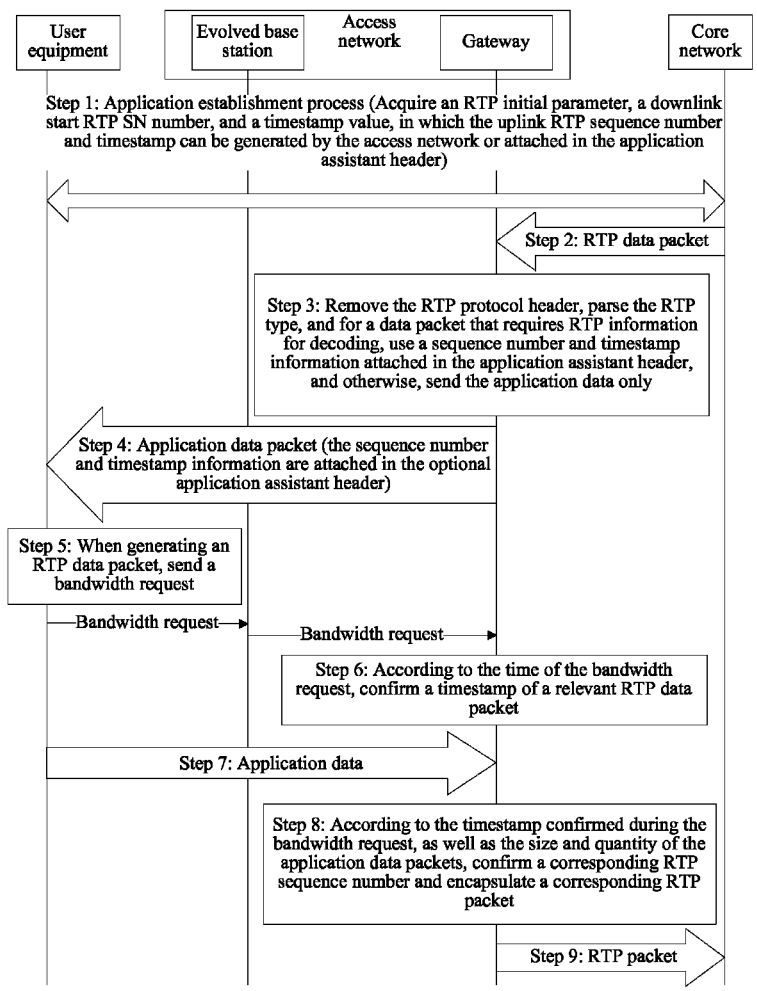
FIG. 11 is a schematic diagram of recovery and context maintenance of an RTP header provided in an embodiment of the present invention.

During the recovery of the RTP header, the network side is required to provide necessary assistance. For example, the network side needs to assist to recovery a timestamp and a sequence number. FIG. 11 is a schematic diagram of recovery and context maintenance of an RTP header, which specifically includes the following steps.

Step 1: In an uplink direction, in an application establishment process, after receiving or generating the corresponding RTP header, the access network maintains context information of the RTP header, for example, the access network utilizes the application proxy/application function to establish context information of the RTP protocol header, and records and maintains the synchronization source identifier and/or contributing source identifier in the RTP header.

According to the maintained context information, the access network encapsulates the data packet and recovers the RTP header, and the following manners may be included.

Manner 1: The application proxy/application function generates the relevant context of the RTP, to realize RTP encapsulation.

In such a manner, the application proxy/application function generates the timestamp and the sequence number and the like in the RTP header.

Manner 2: The UE generates the relevant context of the RTP, to realize the RTP encapsulation.

For a first uplink RTP data packet, the UE sends a complete RTP header, the access network records information in the RTP header, and uses the information for recovery of a subsequent RTP header.

Alternatively, an application assistant layer is set, and the UE sends, to the access network, an RTP data packet whose RTP header is removed, in which the RTP data packet has an application assistant header, and the corresponding sequence number and timestamp and the like are carried in the application assistant header.

Step 2: In a downlink direction, after receiving the RTP data packet from the core network, the access network records and updates the current sequence number and timestamp.

Step 3: The access network removes the RTP protocol header, and parses a RTP type type, and for a data packet that requires RTP information for decoding, the information, such as the sequence number and timestamp, attached in an application assistant header can be used.

Step 4: The access network directly bears an application data packet (optionally, the SN information and timestamp information are attached in the application assistant header) on an access network internal channel and an air interface, and sends the packet to the corresponding UE.

The access network utilizes the maintained context information of the RTP header in the uplink direction to recover the RTP header, and the processing includes the following steps.

In a first case, the uplink bandwidth of the UE is not fixedly allocated by the access network, that is, when the UE needs to send uplink data, the UE needs to apply, from the access network, for the bandwidth for sending data.

Step 5: When generating the RTP data packet, the UE sends a bandwidth request.

Step 6: If no difference exists between a generation period of the RTP data packet of the UE and bandwidth request time, that is, the UE sends the bandwidth request through step 5 upon generating the RTP data packet, the access network confirms the timestamp of a relevant RTP data packet according to the bandwidth request time; and if a certain difference exists between the generation period of the RTP data packet of the UE and the bandwidth request time, that is, the UE generates the RTP data packet, and a certain period later, the UE sends the bandwidth request through step 5, the difference is negotiated during the establishment of a service, and the access network confirms the timestamp of the RTP according to the bandwidth request time and the difference.

Step 7: The UE uses the bandwidth obtained through the bandwidth request to directly send, on the air interface bearer, the application data to the access network.

Step 8: According to the timestamp confirmed in step 6 and according to the size and the quantity corresponding to the application data packets, the access network confirms the sequence number, and encapsulates the corresponding RTP data packet.

In a second case, the uplink bandwidth of the UE is fixedly allocated by the access network, that is, the access network allocates the uplink bandwidth to the UE according to a certain period for sending uplink data.

In this case, the UE uses the periodically allocated bandwidth to directly send, on the air interface bearer, the application data to the access network (not shown).

If a certain difference exists between the bandwidth allocation period and the generation period of the RTP, the difference is negotiated during the establishment of the service, and the access network confirms the timestamp according to the bandwidth allocation period and the difference; if no difference exists between the bandwidth allocation period and the generation period of the RTP, the access network confirms the timestamp according to the bandwidth allocation period. Meanwhile, according to the size and the quantity corresponding to the application data packets, the access network confirms the sequence number, and encapsulates the corresponding RTP data packet.

Step 9: The access network sends the corresponding RTP data packet to the core network.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header; and when the access network transfers data to a core network, the high layer protocol stack header of the uplink data packet is recovered. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

Figure 12:
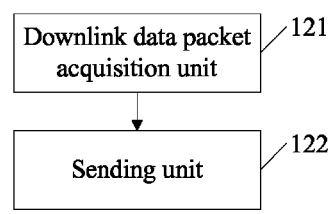
FIG. 12 is a schematic structural diagram of a network apparatus provided in an embodiment of the present invention.

A network apparatus is provided in Embodiment 7 of the present invention, and as shown in FIG. 12, the network apparatus includes:

a downlink data packet acquisition unit 121, configured to acquire a downlink data packet sent to a terminal, in which the downlink data packet does not have a high layer protocol stack header; and a sending unit 122, configured to send the downlink data packet acquired by the downlink data packet acquisition unit 121 to the terminal through an air interface.

Furthermore, the downlink data packet acquisition unit 121 includes a first acquisition module and/or a second acquisition module.

The first acquisition module is configured to receive the downlink data packet sent to the terminal, in which the downlink data packet has a high layer protocol stack header; remove the high layer protocol stack header in the downlink data packet to obtain the downlink data packet sent to the terminal. The second acquisition module is configured to receive an uplink data packet from another terminal, in which the uplink data packet does not have a high layer protocol stack header; and uses the uplink data packet as the downlink data packet sent to the terminal.

When the high layer protocol stack header is being removed, context information related to the header can be maintained according to a requirement; the first acquisition module further includes a protocol information removal unit, which is specifically configured to remove an IP header, record and maintain information in the IP header, where the information in the IP header includes a downlink source/destination IP address, and perform assembly processing on the IP packet with fragments; and/or remove a UDP header, and record and maintain information in the UDP header, in which the information in the UDP header includes a downlink source/destination port number; and/or remove a TCP header, and record and maintain information in the TCP header, in which the information in the TCP header includes a downlink sequence number and a downlink source/destination port number; and/or remove an RTP header, and record and maintain information in the RTP header, in which the information in the RTP header includes a synchronization source identifier and/or contributing source identifier.

The high layer protocol stack header includes at least one or a combination of the following headers:

an Internet Protocol IP header, a User Datagram Protocol UDP header, a Real-Time Transport Protocol RTP header or a Transmission Control Protocol TCP header.

Furthermore, the network apparatus further includes:

an application classification module, configured to parse the downlink data packet, learn corresponding application information, and utilize a preset rule to confirm an application classification; and a bearer mapping module, configured to, during bearer establishment, map an application to an air interface connection according to the application classification confirmed by the application classification module.

The bearer mapping module is specifically configured to set a connection indication identification and an application identification in an air interface connection identifier, in which the connection indication identification is used for indicating an air interface connection, and the application identification is used for indicating an application corresponding to the air interface connection; or, set an application assistant header in a downlink data packet, in which the application assistant header indicates the correspondence between an application and an air interface connection; or, set an extension identification in a wireless access control header of a downlink data packet, in which the extension identification indicates the correspondence between an application and an air interface connection; or, perform in-depth packet detection on a downlink data packet, and confirm an air interface connection corresponding to an application of the downlink data packet.

The air interface connection bears at least two applications, and the air interface connection may be a MAC connection.

When the air interface connection only bears one application, the bearer mapping module of the network apparatus can directly correlate the air interface connection identifier and/or access network internal channel identifier to the application, so as to map the application to the air interface connection.

For the specific work manners of the functional modules and units in the apparatus embodiments of the present invention, reference can be made to the method embodiments of the present invention. The functional modules and units in the apparatus embodiments of the present invention can be separately implemented, and may also be integrated in one or more units. The network apparatus may be an e-NodeB and a GW, may also be an application proxy/application function in an access network, or may be a combination thereof.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header; and when the access network transfers data to a core network, the high layer protocol stack header of the uplink data packet is recovered. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

Figure 13:
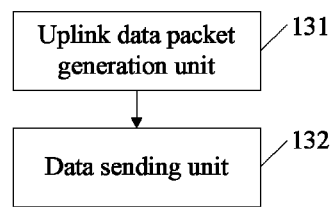
FIG. 13 is a schematic structural diagram of a terminal provided in an embodiment of the present invention.

A terminal is provided in Embodiment 8 of the present invention, and as shown in FIG. 13, the terminal includes:

an uplink data packet generation unit 131, configured to generate an uplink data packet to be sent to an access network, in which the uplink data packet does not have a high layer protocol stack header; and a data sending unit 132, configured to send the uplink data packet of the high layer protocol stack header generated by the uplink data packet generation unit 131 to the access network through an air interface.

Specifically, the uplink data packet generation unit 131 includes an encapsulation module, which is configured to generate the uplink data packet sent to the access network in at least one or a combination of the following manners:

directly encapsulating an application data packet as a media access control MAC data packet, to generate the uplink data packet; or, first encapsulating an application data packet as an RTP data packet, and then encapsulating it as a MAC data packet, to generate the uplink data packet; or, first encapsulating an application data packet as a UDP/TCP data packet, and then encapsulating it as a MAC data packet, to generate the uplink data packet; or, first encapsulating an application data packet as an IP data packet, and then encapsulating it as a MAC data packet, to generate the uplink data packet; or, first encapsulating an application data packet as an RTP data packet and a UDP/TCP data packet in sequence, and then encapsulating it as a MAC data packet, to generate the uplink data packet; or, first encapsulating an application data packet as an RTP data packet and an IP data packet in sequence, and then encapsulating it as a MAC data packet, to generate the uplink data packet; or, first encapsulating an application data packet as a UDP/TCP data packet and an IP data packet in sequence, and then encapsulating it as a MAC data packet, to generate the uplink data packet.

Furthermore, the terminal further includes:

a first bearer unit, configured to utilize a preset rule to confirm an application classification corresponding to the uplink data packet, and during bearer establishment, to map the application on a media access control air interface connection according to the application classification confirmed by the application classification module; or, the terminal may further include a second bearer unit, configured to perform negotiation with the access network to confirm the mapping between the application and the air interface connection, so that the application directly bears the uplink data packet on a corresponding air interface connection. In this case, as long as the data packets generated by a certain application are all placed on a certain air interface connection, the mapping between the application and the air interface connection is confirmed through the negotiation performed between the access network and the terminal.

When the air interface connection only bears one application, the bearer mapping module of the terminal can directly correlate an air interface connection identifier and/or an access network internal channel identifier to the application, so as to map the application on the air interface connection.

When an ultra flat protocol stack structure is adopted in a downlink direction, the terminal further includes:

a data receiving unit, configured to receive a downlink data packet from an access network, in which the downlink data packet does not have a high layer protocol stack header.

For the specific work manners of the functional modules and units in the apparatus embodiments of the present invention, reference can be made to the method embodiments of the present invention. The functional modules and units in the apparatus embodiments of the present invention can be separately implemented, and may also be integrated in one or more units.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header; when transferring data to the core network, the access network recovers the high layer protocol stack header of the uplink data packet. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

Figure 14:
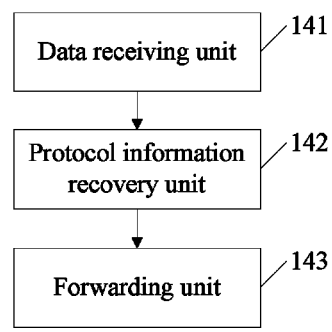
FIG. 14 is a schematic structural diagram of another network apparatus provided in an embodiment of the present invention.

A network apparatus is further provided in Embodiment 9 of the present invention, and as shown in FIG. 14, the network apparatus includes:

a data receiving unit 141, configured to receive an uplink data packet from a terminal, in which the uplink data packet does not have a high layer protocol stack header;

a protocol information recovery unit 142, configured to encapsulate a corresponding high layer protocol stack header for the uplink data packet received by the data receiving unit 141; and a forwarding unit 143, configured to forward the uplink data packet encapsulated with the high layer protocol stack header by the protocol information recovery unit 142.

The protocol information recovery unit 142 is specifically configured to utilize maintained IP header information to encapsulate an IP header for the uplink data packet, in which the IP header information includes a downlink source/destination IP address, and perform fragmentation processing on a received IP packet according to a requirement; and/or utilize maintained UDP header information to encapsulate a UDP header for the uplink data packet, in which the UDP header information includes a downlink source/destination port number; and/or utilize maintained TCP header information to encapsulate a TCP header for the uplink data packet, in which the TCP header information includes a downlink sequence number and a downlink source/destination port number; and/or utilize maintained RTP header information to encapsulate an RTP header for the uplink data packet, in which the RTP header information includes a synchronization source identifier and/or contributing source identifier.

For the specific work manners of the functional modules and units in the apparatus embodiments of the present invention, reference can be made to the method embodiments of the present invention. The functional modules and units in the apparatus embodiments of the present invention can be separately implemented, and may also be integrated in one or more units.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header; when the access network transfers data to the core network, the access network utilizes the maintained context information to recover the high layer protocol stack header of the uplink data packet. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

It can be understood that, the network apparatuses provided in Embodiments 7 and 9 of the present invention can be integrated in one apparatus for implementation, and may also be separately implemented. The network apparatus and the terminal may be implemented by a newly added apparatus or function that only implements the function, and may also be attached to an existing apparatus or function, so as to be compatible with the original system and protocol stack structure.

An embodiment of the present invention further provides a communication system, in which the system includes: the network apparatus which is configured to acquire a downlink data packet sent to a terminal, in which the downlink data packet does not have a high layer protocol stack header; send the downlink data packet to the terminal through an air interface; or, receive an uplink data packet from a terminal, in which the uplink data packet does not have a high layer protocol stack header; encapsulate a corresponding high layer protocol stack header for the uplink data packet; and forward the uplink data packet encapsulated with the high layer protocol stack header.

In the technical solutions provided in the embodiment of the present invention, a point-to-point characteristic of transmission in a wireless network is utilized, to perform flattening processing on existing protocol stacks, so a data packet transmitted between an access network and a terminal through an air interface does not need to carry an unnecessary high layer protocol stack header; when the access network transfers data to the core network, the access network recovers the high layer protocol stack header of the uplink data packet. Through the technical solutions in the embodiment of the present invention, the data amount in the air interface transmission is reduced to a great extent, the efficiency of air interface transmission is substantially enhanced, and the air interface resource is saved, thereby facilitating the enrichment and development of wireless services and satisfying the demands of users.

It is clear to persons skilled in the art that the present invention may be accomplished through software plus a necessary universal hardware platform. Based on such understanding, the technical solutions of the present invention or the part that makes contributions to the prior art can be embodied in the form of a software product. The software product may be stored in a storage media, such as a ROM/RAM, a magnetic disk, and an optical disk, and contains several instructions used to instruct a computer equipment (for example, a personal computer, a server, or network equipment) to perform the method according to the embodiments or some parts of the embodiments of the present invention.

It should be understood that the above descriptions are merely about specific embodiments of the present invention, but the protection scope of the present invention is not limited thereto. Any modification or replacement made by persons skilled in the art without departing from the technical scope disclosed in the present invention should fall within the protection scope of the present invention, and the protection scope of the present invention should be subject to the appended claims.

What is claimed is:

1. A data transmission method for a network side equipment capable of being communicably coupled to a terminal, the method comprising:
receiving, by the network side equipment, a first downlink data packet sent for the terminal and preparing a second downlink data packet without a high layer protocol stack header by removing the high layer protocol stack header in the first downlink data packet and maintaining context information related to the removed high layer protocol stack header to recover the removed high layer protocol stack header when receiving an uplink data packet without a high layer protocol stack header from the terminal,
wherein before sending the second downlink data packet to the terminal through an air interface connection, the network side equipment performing processes of:
parsing the first downlink data packet, and learning corresponding information of an application of an application layer,
utilizing a rule to confirm classification of the application of the application layer,
during bearer establishment, mapping the application of the application layer to the air interface connection according to the classification of the application of the application layer, and
setting an application-air interface convergence sublayer; and
wherein the terminal processes the second downlink data packet without the high layer protocol stack header that is sent to the terminal through the air interface connection by:
utilizing the application-air interface convergence sublayer to parse the second downlink data packet and learn corresponding information of the application of the application layer,
utilizing the rule to confirm the classification of the application of the application layer, and
correlating the application of the application layer to the air interface connection according to the mapping.

2. The data transmission method according to claim 1, further comprising:
receiving an uplink data packet from another terminal, wherein the uplink data packet is without a high layer protocol stack header; and
using the uplink data packet as a downlink data packet sent to the another terminal.

3. The data transmission method according to claim 1, wherein the removed high layer protocol stack header comprises at least one or a combination of the following headers:
an Internet Protocol (IP) header, a User Datagram Protocol (UDP) header, a Real-Time Transport Protocol (RTP) header and a Transmission Control Protocol (TCP) header; and
when removing the high layer protocol stack header of the downlink data packet, the maintaining the context information related to the high layer protocol stack header comprises at least one or a combination of the following processes:
removing the IP header, and recording and maintaining information in the IP header, wherein the information in the IP header comprises a downlink source/destination IP address, and the information in the IP header belongs to the context information;
removing the UDP header, and recording and maintaining information in the UDP header, wherein the information in the UDP header comprises a downlink source/destination port number, and the information in the UDP header belongs to the context information;
removing the TCP header, and recording and maintaining information in the TCP header, wherein the information in the TCP header comprises a downlink sequence number and a downlink source/destination port number, and the information in the TCP header belongs to the context information; and
removing the RTP header, and recording and maintaining information in the RTP header, wherein the information in the RTP header comprises a synchronization source identifier and/or a contributing source identifier, and the information in the RTP header belongs to the context information.

4. The data transmission method according to claim 1, wherein during the bearer establishment, mapping the application on the air interface connection according to the application classification comprises:
utilizing the application classification to directly correlate an air interface connection identifier and/or an access network internal channel identifier to the application, so as to map the application on the air interface connection, wherein the air interface connection only bears the application; or
utilizing the application classification to correlate at least two applications on the air interface connection, wherein the air interface connection bears at least two applications.

5. The data transmission method according to claim 4, wherein the utilizing the application classification to correlate the at least two applications on the air interface connection, wherein the air interface connection bears the at least two applications, comprises at least one or a combination of the following processes:
setting a connection indication identification and an application identification in the air interface connection identifier, wherein the connection indication identification is used for indicating the air interface connection, and the application identification is used for indicating an application corresponding to the air interface connection;
setting an application assistant header in the downlink data packet, wherein the application assistant header indicates a correspondence between an application and the air interface connection;
setting an extension identification in a wireless access control header of the downlink data packet, wherein the extension identification indicates a correspondence between an application and the air interface connection; and
performing in-depth packet detection on the downlink data packet, and confirming the air interface connection corresponding to an application of the downlink data packet.

6. The data transmission method according to claim 1, wherein before the sending of the second downlink data packet to the terminal through the air interface connection, performing by the network side equipment processes of:
- informing, through a system broadcast message, the terminal of an ultra flat protocol stack capability supported by an access network; or
- during the bearer establishment process, informing, through a bearer establishment request message, the terminal of an ultra flat protocol stack capability supported by an access network;
- wherein the ultra flat protocol stack capability is a capability that the access network supports an inessential high layer protocol stack header and/or a manner of implementing lack of certain information of the high layer protocol stack header.

7. A data transmission method for a terminal capable of being communicably coupled to an access network, the method comprising:
- generating, by the terminal, an uplink data packet to be sent to the access network, wherein the uplink data packet does not have a high layer protocol stack header by removing the high layer protocol stack header in the uplink data packet and maintaining context information related to the removed high layer protocol stack header to recover the removed high layer protocol stack header when receiving a downlink data packet without a high layer protocol stack header from the access network,
- wherein before sending, by the terminal, the uplink data packet to the access network through an air interface connection, performing processes of:
  - setting an application-air interface convergence sub-layer,
  - utilizing the application-air interface convergence sub-layer to confirm classification of an application of an application layer corresponding to the uplink data packet according to a rule, and
  - during bearer establishment, mapping the application of the application layer to the air interface connection according to the classification of the application of the application layer; and
  - sending the uplink data packet to the access network through the air interface connection.

8. The data transmission method according to claim 7, wherein the uplink data packet sent to the access network is generated in at least one or a combination of the following manners:
- directly encapsulating a data packet of the application of the application layer as a media access control (MAC) data packet, to generate the uplink data packet;
- first encapsulating a data packet of the application of the application layer as an Real-Time Transort Protocol (RTP) data packet, and then encapsulating it as a MAC data packet, to generate the uplink data packet;
- first encapsulating a data packet of the application of the application layer as a User Datagram Protocol/Transmission Control Protocol (UDP/TCP) data packet, and then encapsulating it as a MAC data packet, to generate the uplink data packet;
- first encapsulating a data packet of the application of the application layer as an Internet Protocol (IP) data packet, and then encapsulating it as a MAC data packet, to generate the uplink data packet;
- first encapsulating a data packet of the application of the application layer as an RTP data packet and a UDP/TCP data packet in sequence, and then encapsulating it as a MAC data packet, to generate the uplink data packet;
- first encapsulating a data packet of the application of the application layer as an RTP data packet and an IP data packet in sequence, and then encapsulating it as a MAC data packet, to generate the uplink data packet; and
- first encapsulating a data packet of the application of the application layer as a UDP/TCP data packet and an IP data packet in sequence, and then encapsulating it as a MAC data packet, to generate the uplink data packet.

9. The data transmission method according to claim 7, wherein before the sending of the uplink data packet to the access network through the air interface connection, performing by the terminal processes of:
- negotiate with the access network to confirm the mapping between the application of the application layer and the air interface connection, wherein the application of the application layer directly bears the uplink data packet on a corresponding air interface connection; or
- sending a capability negotiation message to the access network, wherein the capability negotiation message indicates an ultra flat protocol stack capability supported by the terminal;
- wherein the ultra flat protocol stack capability is a capability that the terminal supports an inessential high layer protocol stack header and/or a manner of implementing lack of certain information of the high layer protocol stack header.

10. A data transmission method for a network side equipment capable of being communicably coupled to a terminal, the method comprising:
- receiving, by the network side equipment, an uplink data packet from the terminal, wherein a high layer protocol stack header of the uplink data packet is removed by the terminal;
- encapsulating, by the network side equipment, a corresponding high layer protocol stack header for the uplink data packet received from the terminal to recover the removed high layer protocol stack header, according to higher layer protocol stack header information maintained by recording higher layer protocol stack header information based upon transmission of a downlink packet to the terminal; and
- forwarding the uplink data packet encapsulated with the high layer protocol stack header.

11. The data transmission method according to claim 10, wherein the encapsulating the corresponding high layer protocol stack header for the uplink data packet comprises at least one or a combination of the following processes:
- utilizing maintained IP header information to encapsulate an Internet Protocol (IP) header for the uplink data packet, wherein the IP header information comprises a downlink source/destination IP address;
- utilizing maintained User Datagram Protocol (UDP) header information to encapsulate a UDP header for the uplink data packet, wherein the UDP header information comprises a downlink source/destination port number;
- utilizing maintained Transmission Control Protocol (TCP) header information to encapsulate a TCP header for the uplink data packet, wherein the TCP header information comprises a downlink sequence number and a downlink source/destination port number; and
- utilizing maintained Real-Time Transport Protocol (RTP) header information to encapsulate an RTP header for the uplink data packet, wherein information in the RTP header comprise a synchronization source identifier and/or a contributing source identifier.

12. A network apparatus capable of being communicably coupled to a terminal, the network apparatus comprising:
- a downlink data packet acquisition unit, configured to receive a first downlink data packet sent for the terminal and preparing a second downlink data packet without a high layer protocol stack header by removing the high layer protocol stack header in the first downlink data packet and maintaining context information related to the removed high layer protocol stack header to recover the removed high layer protocol stack header when receiving an uplink data packet without a high layer protocol stack header from the terminal, wherein before sending the second downlink packet to the terminal through an air interface connection, performing processes of:

parsing the downlink data packet, and learning corresponding information of an application of an application layer, during bearer establishment, mapping an application of the application layer to the air interface connection according to a classification of the application of the application layer on basis of a rule, and setting an application-air interface convergence sublayer; and a sending unit, configured to send the second downlink data packet without the high layer protocol stack header to the terminal through the air interface connection, wherein the terminal is capable of processing the downlink data packet without the high layer protocol stack header that is sent to the terminal through the air interface connection by:

utilizing the application-air interface convergence sublayer to parse the downlink data packet and learn corresponding information of the application of the application layer, utilizing the rule to confirm the classification of the application of the application layer, and correlating the application of the application layer to the air interface connection according to the mapping.

13. The network apparatus according to claim 12, wherein the downlink data packet acquisition unit is configured to receive an uplink data packet from another terminal, wherein the uplink data packet is without a high layer protocol stack header; and to use the uplink data packet as a downlink data packet sent to the another terminal.

14. The network apparatus according to claim 12, wherein the first acquisition module further comprises a protocol information removal unit, the protocol information removal unit is configured to perform at least one or a combination of the following processes:

remove an Internet Protocol (IP) header, and record and maintain information in the IP header, wherein the information in the IP header comprises a downlink source/destination IP address;

remove a User Datagram Protocol (UDP) header, and record and maintain information in the UDP header, wherein the information in the UDP header comprises a downlink source/destination port number;

remove a Transmission Control Protocol (TCP) header, and record and maintain information in the TCP header, wherein the information in the TCP header comprises a downlink sequence number and a downlink source/destination port number; and remove an Real-Time Transport Protocol (RTP) header, and record and maintain information in the RTP header, wherein the information in the RTP header comprises a synchronization source identifier and/or a contributing source identifier; and the high layer protocol stack header comprises at least one or a combination of the following headers:

the IP header, the UDP header, RTP header and the TCP header.

15. The network apparatus according to claim 12, wherein, a bearer mapping module configured to perform for the bearer establishment at least one or a combination of the following processes:

set a connection indication identification and identification of an application of an application layer in an air interface connection identifier, wherein the connection indication identification is used for indicating the air interface connection, and the application identification is used for indicating the application corresponding to the air interface connection;

set an application assistant header in the downlink data packet, wherein the application assistant header indicates a correspondence between the application of the application layer and the air interface connection;

set an extension identification in a wireless access control header of the downlink data packet, wherein the extension identification indicates a correspondence between the application of the application layer and the air interface connection; and perform in-depth packet detection on the downlink data packet, and confirm the air interface connection corresponding to the application layer application of the downlink data packet;

wherein the air interface connection bears at least two applications of the application layer.

16. A terminal capable of being communicably coupled to an access network, the terminal comprising:

an uplink data packet generation unit, configured to generate an uplink data packet to be sent to the access network, wherein the uplink data packet does not have a high layer protocol stack header by removing the high layer protocol stack header in the uplink data packet and maintaining context information related to the removed high layer protocol stack header to recover the removed high layer protocol stack header when receiving a downlink data packet without a high layer protocol stack header from the access network, wherein before sending the uplink data packet to the access network through tan air interface connection, performing processes of:

setting an application-air interface convergence sublayer, utilizing the application-air interface convergence sublayer to confirm classification of an application of an application layer corresponding to the uplink data packet according to a rule, and during bearer establishment, mapping the application of the application layer to the air interface connection according to the classification of the application of the application layer; and a data sending unit, configured to send the uplink data packet generated by the uplink data packet generation unit to the access network through the air interface connection.

17. The terminal according to claim 16, wherein the uplink data packet generation unit comprises an encapsulation module, the encapsulation module is configured to generate the uplink data packet sent to the access network in at least one or a combination of the following manners:

directly encapsulating a data packet of the application of the application data as a media access control (MAC) data packet, to generate the uplink data packet;

first encapsulating a data packet of the application of the application layer as an Real-Time Trans ort Protocol (RTP) data packet, and then encapsulating it as a MAC data packet, to generate the uplink data packet;

first encapsulating the data packet of the application of the application layer as a User Datagram Protocol/Transmission Control Protocol (UDP/TCP) data packet, and then encapsulating it as a MAC data packet, to generate the uplink data packet;

first encapsulating a data packet of the application of the application layer as an Internet Protocol (IP) data packet, and then encapsulating it as a MAC data packet, to generate the uplink data packet;

first encapsulating a data packet of the application of the application layer as an RTP data packet and a UDP/TCP data packet in sequence, and then encapsulating it as a MAC data packet, to generate the uplink data packet;

first encapsulating a data packet of the application of the application layer as an RTP data packet and an IP data packet in sequence, and then encapsulating it as a MAC data packet, to generate the uplink data packet; and first encapsulating a data packet of the application of the application layer as a UDP/TCP data packet and an IP data packet in sequence, and then encapsulating it as a MAC data packet, to generate the uplink data packet.

18. The terminal according to claim 16, further comprising:
a bearer unit, configured to perform negotiation with the access network to confirm the mapping between the application of the application layer and the air interface connection, so that the application of the application layer directly bears the uplink data packet on a corresponding air interface connection.

19. A network apparatus capable of being communicably coupled to a terminal, the network apparatus comprising:
a data receiving unit, configured to receive an uplink data packet from the terminal, wherein a high layer protocol stack header of the uplink data packet is removed by the terminal;
a protocol information recovery unit, configured to encapsulate a corresponding high layer protocol stack header for the uplink data packet received from the terminal to recover the removed high layer protocol stack header, according to higher layer protocol stack header information maintained by recording higher layer protocol stack header information based upon transmission of a downlink packet to the terminal; and
a forwarding unit, configured to forward the uplink data packet encapsulated with the high layer protocol stack header by the protocol information recovery unit.

* * * * *

UNITED STATES PATENT AND TRADEMARK OFFICE
CERTIFICATE OF CORRECTION

PATENT NO. : 9,055,471 B2
APPLICATION NO. : 13/465438
DATED : June 9, 2015
INVENTOR(S) : Lei Lu et al.

Page 1 of 1

It is certified that error appears in the above-identified patent and that said Letters Patent is hereby corrected as shown below:

In the claims

Claim 8, Column 25, Line 50:

Delete "Trans ort" and insert --Transport--, therefor.

Claim 17, Column 29, Line 2:

Delete "Trans ort" and insert --Transport--, therefor.

Signed and Sealed this
Thirteenth Day of October, 2015

Michelle K. Lee
*Director of the United States Patent and Trademark Office*